(12) United States Patent     (10) Patent No.: US 9,237,086 B2
Devdhar     (45) Date of Patent: Jan. 12, 2016

(54) METHODS AND APPARATUS FOR NETWORK TRAFFIC DISTRIBUTION BASED ON RANDOM NUMBER VALUES

(75) Inventor: Rakendu Devdhar, Germantown, MD (US)

(73) Assignee: GENBAND US LLC, Plano, TX (US)

( * ) Notice: Subject to any disclaimer, the term of this patent is extended or adjusted under 35 U.S.C. 154(b) by 555 days.

(21) Appl. No.: 12/129,766

(22) Filed: May 30, 2008

(65) Prior Publication Data

US 2009/0300195 A1     Dec. 3, 2009

(51) Int. Cl.
| | |
|---|---|
| G06F 15/16 | (2006.01) |
| G06F 15/173 | (2006.01) |
| H04L 12/701 | (2013.01) |
| H04L 12/707 | (2013.01) |
| H04L 12/801 | (2013.01) |
| H04L 12/803 | (2013.01) |
| H04L 29/08 | (2006.01) |
| H04L 12/24 | (2006.01) |

(52) U.S. Cl.
CPC ............... *H04L 45/00* (2013.01); *H04L 45/22* (2013.01); *H04L 47/10* (2013.01); *H04L 47/125* (2013.01); *H04L 67/30* (2013.01); *H04L 41/5009* (2013.01)

(58) Field of Classification Search
CPC .... H04L 41/5009; H04L 45/00; H04L 47/125
USPC ................................................. 709/229, 225
See application file for complete search history.

(56) References Cited

U.S. PATENT DOCUMENTS

| | | | |
|---|---|---|---|
| 5,430,729 A | 7/1995 | Rahnema | |
| 6,128,642 A | 10/2000 | Doraswamy et al. | |
| 6,141,410 A | 10/2000 | Ginzboorg | |
| 6,173,322 B1* | 1/2001 | Hu | 709/224 |
| 6,285,748 B1 | 9/2001 | Lewis | |
| 6,314,293 B1 | 11/2001 | Servi et al. | |
| 6,389,448 B1 | 5/2002 | Primak et al. | |
| 6,816,584 B1 | 11/2004 | Armstrong et al. | |
| 6,980,521 B1* | 12/2005 | Jarvis | H04L 45/00 370/238 |
| 7,002,973 B2 | 2/2006 | MeLampy et al. | |
| 7,028,092 B2 | 4/2006 | MeLampy et al. | |
| 7,151,781 B2 | 12/2006 | MeLampy et al. | |
| 7,336,613 B2 | 2/2008 | Lloyd et al. | |
| 7,349,346 B2 | 3/2008 | Castelino | |
| 2002/0163887 A1* | 11/2002 | Suni | H04L 12/5602 370/232 |
| 2004/0114569 A1* | 6/2004 | Naden et al. | 370/351 |

(Continued)

OTHER PUBLICATIONS

Notification of Transmittal of the International Search Report and the Written Opinion of the International Searching Authority, or the Declaration for International Application No. PCT/US2009/045840 (Dec. 28, 2009).

*Primary Examiner* — Evans Desrosiers
*Assistant Examiner* — Lawrence Cosby
(74) *Attorney, Agent, or Firm* — Jenkins, Wilson, Taylor & Hunt, P.A.

(57) ABSTRACT

In one embodiment, a method includes receiving a routing distribution profile associated with a set of network resources disposed between a source endpoint and a destination endpoint. The set of network resources is within a session over Internet Protocol (SoIP) network. A distribution function is defined based on the routing distribution profile and based on a range of random number values. The distribution function is used to route via a network resource from the set of network resources a request to establish a session between the source endpoint and the destination endpoint.

19 Claims, 6 Drawing Sheets

(56) References Cited

U.S. PATENT DOCUMENTS

| | | |
|---|---|---|
| 2004/0210657 A1* | 10/2004 | Narayanan et al. ........... 709/227 |
| 2005/0265283 A1 | 12/2005 | Qi et al. |
| 2007/0050761 A1* | 3/2007 | Hester et al. .................. 717/168 |
| 2007/0078986 A1* | 4/2007 | Ethier ................ H04L 65/1069 709/227 |
| 2008/0101335 A1* | 5/2008 | Badger ........................ 370/352 |

* cited by examiner

METHODS AND APPARATUS FOR NETWORK TRAFFIC DISTRIBUTION BASED ON RANDOM NUMBER VALUES

BACKGROUND

Embodiments relate generally to traffic distribution within a network, and, in particular, to methods and apparatus for network traffic distribution based on random number values.

A network routing device can be configured to route incoming network traffic to one or more target network resources based on a variety of known network resource selection algorithms such as round robin algorithms, water fall algorithms, and/or percentage utilization algorithms. These known network resource selection algorithms can be defined based on, for example, operational, financial, and/or administrative objectives associated with one or more of the target network resources.

These known network resource selection algorithms, however, have one or more disadvantages. For example, some known percentage utilization algorithms can consume substantial computational and/or memory resources. They require processing of large volumes of historical data and/or continual polling of network resources to determine current and/or historical utilization. Despite advances in hardware/software processing capabilities, some of these known selection algorithms may be difficult to adapt to scalable networking systems. Some known network resource selection algorithms provide reasonable results in only predictable, even traffic flow environments, but not in uneven/dynamic traffic environments. Accordingly, methods and apparatus are needed to address the shortfalls of known network resource selection algorithms and to provide other new and innovative features.

SUMMARY

In one embodiment, a method includes receiving a routing distribution profile associated with a set of network resources disposed between a source endpoint and a destination endpoint. The set of network resources is within a session over Internet Protocol (SoIP) network. A distribution function is defined based on the routing distribution profile and based on a range of random number values. The distribution function is used to route via a network resource from the set of network resources a request to establish a session between the source endpoint and the destination endpoint.

DETAILED DESCRIPTION

A session exchange device within a session over Internet Protocol (SoIP) network can be configured to route a session request (or a portion of a session request) from a source endpoint to a destination endpoint based on a random number value. Specifically, the session exchange device can be configured to route the session request via a network resource selected from a set of network resources based on a random number value. In addition, the session exchange device can be configured to route the session request in accordance with a utilization target value (e.g., in accordance with a utilization target value over a specified period of time and/or within specified statistical limits) associated with the network resource based on the random number value. The utilization target value can be from a set of utilization target values associated with the set of network resources. The utilization target values can define a routing distribution profile (also can be referred to as a distribution profile or a target distribution profile).

In some embodiments, the session exchange device can be configured to route a session request based on a relationship defined using a routing distribution profile and a ranges of number values. The relationship can be defined so that the session exchange device can route the session request independent of historical utilization-related data (also can be referred to as historical utilization data) associated with the network resource. The historical utilization-related data can include real-time (e.g., recent, current) utilization measurement value(s) and/or past utilization measurement value(s). The historical utilization-related data can also be state information, for example, indicating whether or not a network resource is available. A utilization measurement value (also can be referred to as utilization) can, in some embodiments, represent the proportion of a network resource in use for an activity, such as responding to a session request, during a specified past period of time. In some embodiments, the relationship, which can be a linear relationship or a non-linear relationship, can be defined based on, for example, a calibration method.

In some embodiments, the relationship used by a session exchange device to route a session request can be based on a variety of parameter values that can be, for example, associated with any layer of the open systems interconnection (OSI) model (e.g., session layer (layer-5 of the OSI model and above), media-layer (layer-3 of the OSI model)). In some embodiments, the parameter value(s) can be associated with the session request. One or more of the parameter values can vary independent of the utilization (e.g., measured utilization or utilization measurement value) of one or more network resources from the set of network resources. In some embodiments, routing based on one or more random number values can be referred to as routing based on a random number value selection algorithm.

Figure 1:
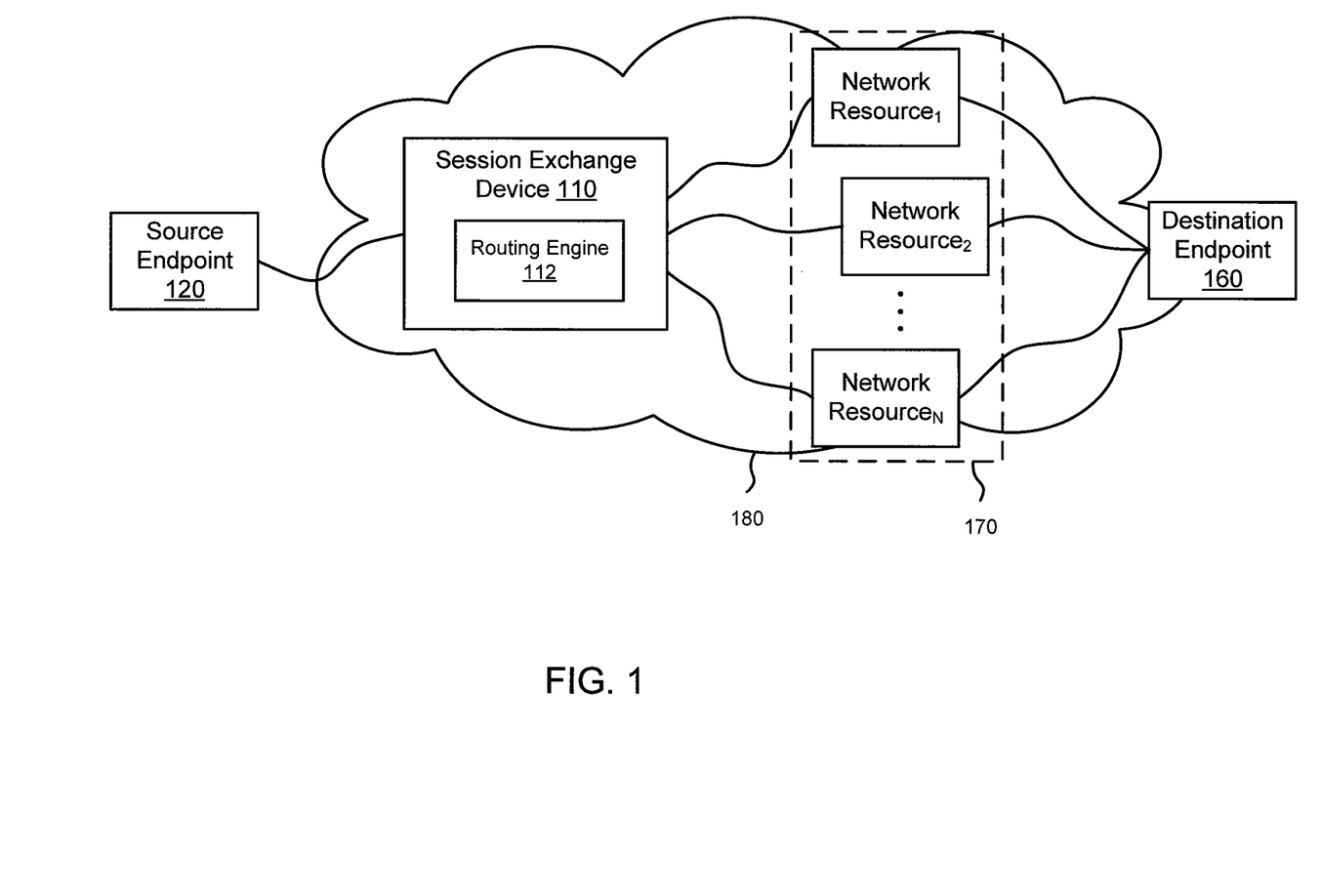
FIG. 1 is a schematic diagram that illustrates a routing module of a session exchange device configured to route a session request over a session over Internet Protocol (SoIP) network from a source endpoint to a destination endpoint based on a random number value, according to an embodiment.

FIG. 1 is a schematic diagram that illustrates a routing engine 112 of a session exchange device 110 configured to route a session request over a SoIP network 180 from a source endpoint 120 to a destination endpoint 160 based on a random number value, according to an embodiment. Specifically, the routing engine 112 is configured to use the random number value to determine through which network resource(s) from a set of network resources 170 the session request should be routed to the destination endpoint 160. After the session request has been sent to the selected network resource from the set of network resources 170, the selected network resource can process (e.g., respond to, deny) the session request. The set of network resources 170 include network resources 1 to N (i.e., network resource$_1$, network resource$_2$, ... network resources$_n$). As shown in FIG. 1, the set of network resources 170 is disposed between the session exchange device 110 and the destination endpoint 160.

The routing engine 112 can be configured to produce a random number value in response to the session request being received at the session exchange device 110 from the source endpoint 120. The routing engine 112 can be configured to route the session request to, for example, one of the network resources from the set of network resources 170 when the random number value satisfies one or more conditions. The condition(s) can be defined based on a set of utilization target values not only associated with the set of network resources 170 but also defining a routing distribution profile.

For example, the session request can be routed to network resource$_1$ when the random number value falls within a range of number values defined based on a target utilization value associated with network resource$_1$. In some embodiments, the routing engine 112 can be configured to route the session request based on a distribution function defined based on the routing distribution profile associated the set of network resources 170.

In some embodiments, if a network resource from the set of network resources 170 denies a session request that has been routed to the network resource based on a first random number value, the routing engine 112 can be configured to route the session request based on a second random number value. In other words, the session request can be routed based on re-execution of a random number value selection algorithm. In some embodiments, the session request can be routed to the same network resource or a different network resource from the set of network resources 170 after re-execution of the random number value selection algorithm.

In some embodiments, if a network resource from the set of network resources 170 denies a session request that has been routed to the network resource based on a random number value, the routing engine 112 can be configured to route the session request based on a different network resource selection algorithm (e.g., a round robin selection algorithm). In some embodiments, if a session request is denied by a network resource selected from the set of network resources 170 based on a random number value, the routing engine 112 can be configured to abandon further processing of the session request. In some embodiments, the type of policy and/or the priority of the policy applied upon denial of a session request can be defined by, for example, a network administrator.

The routing engine 112 can be a software-based module (e.g., a set of instructions executable at a processor, a software application) and/or a hardware-based module (e.g., a processor, an application-specific integrated circuit (ASIC), a field programmable gate array (FPGA)). In some embodiments, the routing engine 112 can be associated with one or more memory components (not shown) and/or one or more processing components (not shown).

The session request can be a request to establish a session between the source endpoint 120 and the destination endpoint 160. The session can be established so that, for example, a signal (e.g., a media signal) associated with the session can be transmitted between the source endpoint 120 and the destination endpoint 160. The signal can be, for example, a stream of packets (e.g., Ethernet packets) encoded with voice content, video content, and/or data content. In some embodiments, the signal can be encoded as a digital signal and/or as an analog signal (e.g., some portions of the signal can be digital while other portions of the signal can be analog). The signal can be defined based on, for example, a media-layer protocol.

In some embodiments, the session request can be defined in accordance with a session control protocol such as session initiation protocol (SIP). In some embodiments, the session request can be referred to as a signaling request and can be an in-band request and/or an out-of-band request (e.g., some portions of the session request can be in-band while other portions of the session request can be out-of-band). The session request can be defined at the source endpoint 120 in response to, for example, an interaction of a user with the source endpoint 120. In some embodiments, the session request can be translated into a different session control protocol at the session exchange device 110 before being forwarded to, for example, network resource$_2$.

The source endpoint 120, each network resource from the set of network resources 170, and/or the destination endpoint 160 can be, for example, a router, a public switched telephone network (PSTN), a broadband network that can provide network access to broadband consumers, an enterprise network, an H.323 network, a SIP softswitch network, a SIP network, an individual phone/computer terminal and/or an access point (e.g., another session exchange device) to another SoIP network (not shown). In some embodiments, the network resources 170 can be controlled by a carrier (e.g., a local exchange carrier, a network operator, a wireless communication carrier) that provides, for example, telecommunications services (e.g., telephony services, data communications services) via the network resources 170. In some embodiments, one or more network resources from the set of network resources 170 can be controlled by one or more entities that are different than the entity associated with (e.g., controlling) the session exchange device 110. In some embodiments, each network resource from the set of network resources 170 can be configured with substantially equivalent capability to handle a session request routed based on a random number value.

Although shown as a single SoIP network 180 in this embodiment, the SoIP network 180 can be a collection of one or more SoIP networks, can be associated with a separate SoIP network (not shown), and/or can have more than one wired and/or wireless segment. The SoIP network 180 can be, for example, a voice over Internet Protocol (VoIP) network, a video over Internet Protocol network, and/or a media over Internet Protocol (MoIP) network.

The session exchange device 110 can function as a multi-protocol session exchange device and can be configured to function as an interface device between the source endpoint 120 and the network resources 170. In some embodiments, the session exchange device 110 can be a session-aware device. In some embodiments, the session exchange device 110 can function as a session border controller (SBC) and/or can be associated with a session border controller (not shown). Such an SBC can be configured to establish, control, and monitor sessions (also can be referred to as connections) between one or more endpoints such as the source endpoint 120, the network resources 170, and/or the destination endpoint 160 based on information such as, for example, session-layer information (e.g., layer-5 and above of the OSI model).

The SBC can be configured to communicate with a SBC-network controller (not shown) that is, for example, a centralized management component that can be configured to control, configure, and/or coordinate one or more portions of the SoIP network 180.

Figure 2A:
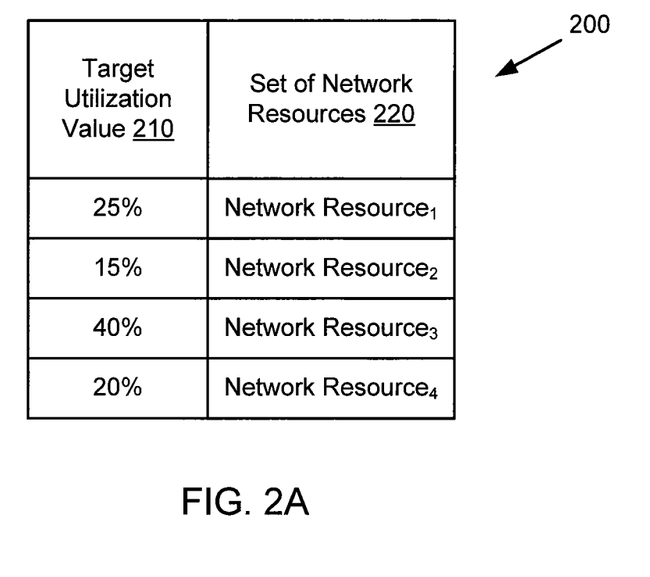
FIG. 2A is a table that illustrates a routing distribution profile associated with a set of network resources, according to an embodiment.

FIG. 2A is a table 200 that illustrates a routing distribution profile associated with a set of network resources 220, according to an embodiment. As shown in FIG. 2A, the set of network resources 220 includes network resource$_1$, network resource$_2$, network resource$_3$, and network resource$_4$. Each network resource from the set of network resources 220 is associated with a target utilization value 210. For example, network resource$_1$ is associated with a target utilization value of 25% (shown in column 210) and network resource$_3$ is associated with a target utilization value of 40% (shown in column 210).

Collectively, the target utilization values 210 can define (or represent) a desirable distribution profile (e.g., a desirable allocation) of network-related traffic, such as session requests, between network resources within the set of network resources 220. For example, the target utilization value of 25% associated with network resource$_3$ is an indicator that 25% of specified network-related traffic (e.g., session requests) should be routed via network resource$_3$. The target utilization values 210 shown in FIG. 2A define a non-uniform distribution profile because at least one of the target utilization values 210 is different than the other target utilization values 210. In fact, the target utilization values 210 in this embodiment define a completely non-uniform distribution profile because each of the target utilization values 210 are different from one another.

In some embodiments, the target utilization values 210 can be defined by an entity associated with the set of network resources 220 (e.g., an entity controlling the set of network resources 220). In some embodiments, the target utilization values 210 can be defined at an entity separate from a session exchange device. In some embodiments, the target utilization values 210 can be defined based on financial considerations. For example, a target utilization value 210 associated with, for example, network resource$_2$ can be defined based on a desirable profit margin associated with network-related traffic routed through network resource$_2$ as compared with network resource$_1$. In some embodiments, each of the target utilization values 210 can represent, for example, a maximum proportion of network-related traffic that can be distributed to a particular network resource from the set of network resources 220.

In some embodiments, the target utilization values 210 can be associated with a particular type of network traffic. For example, the target utilization values 210 can be associated with only session requests from a particular set of source endpoints, or associated with only a particular type of session request (e.g., a session request defined based on a particular protocol). In some embodiments, the target utilization values 210 can be global values that can be used by, for example, multiple session exchange devices in making routing decisions.

Figure 2B:
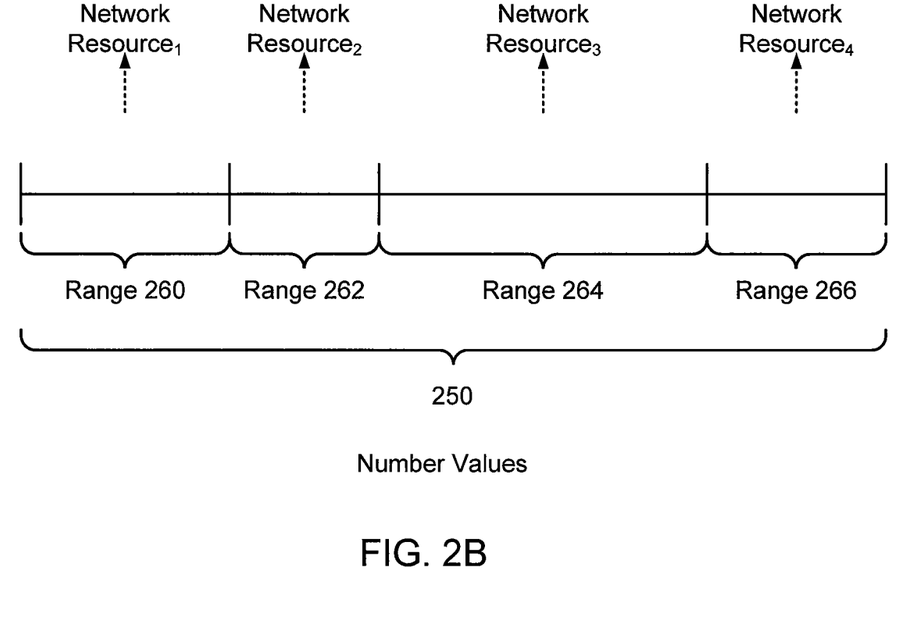
FIG. 2B is a schematic diagram that illustrates ranges of number values that can be used by a session exchange device to route a session request to at least one network resource referenced in FIG. 2A, according to an embodiment

FIG. 2B is a schematic diagram that illustrates ranges of number values that can be used by a session exchange device to route a session request to at least one network resource referenced in FIG. 2A, according to an embodiment. As shown in FIG. 2B, each range of number values-range 260, range 262, range 264, and range 266—from a domain of number values 250 is associated with a network resource from the network resources referenced in FIG. 2A. For example, range 260 is associated with network resource$_1$ and range 264 is associated with network resource$_3$. In some embodiments, the number value ranges 260, 262, 264, and 266 can be referred to as random number value ranges. In some embodiments, the domain of number values 250 can be referred to as a domain of random number values.

In response to receipt of a session request, the session exchange device can produce a random number value from within the domain of number values 250. The session exchange device can then route the session request based on the random number value falling within one of the ranges of number values 260, 262, 264, and/or 266. For example, if the random number value were to fall within range 262, the session exchange device could route the session request to network resource$_2$. Said differently, the session request can be routed to network resource$_2$ because the condition associated with network resource$_2$ has been satisfied based on the random number value.

The ranges of number values 260, 262, 264, and 266, can be scaled relative to one another so that each of the network resources will have a desirable probability of being selected by the session exchange device for processing of a session request based on the random number value. The ranges of number values 260, 262, 264, and 266 can be defined in proportion to one another based on a desirable routing distribution profile. For example, in this embodiment, the number value ranges 260, 262, and 264, and 266 are defined based on the target utilization values 210 shown in FIG. 2A. For example, number value range 260, which is associated with network resource$_1$, includes a percentage of number values from the domain 250 that corresponds with the target utilization value of 25%, which is associated with network resource$_1$ as shown in column 210 of FIG. 2A. Accordingly, in this embodiment, network resource$_1$ has a 25% probability of being selected to process the session request based on a randomly produced number value from the domain of number values 250.

Session requests can be routed to one or more of the network resources 220 (referenced in FIG. 2A and FIG. 2B) based on random number values and the number value ranges 260, 262, 264, and 266 shown in FIG. 2B without using utilization-related data (e.g., historical utilization-related data, current utilization-related data). In other words, the routing can be accomplished without computing a utilization value (e.g., a current utilization value, past utilization value, a resource consumption value) based on utilization-related data. Utilization-related data can be, for example, data indicating the number of session requests processed at a particular network resource over a specified period of time. Accordingly, the routing by the session exchange device can also be performed independent of network traffic patterns. In other words, the routing can be performed regardless of network traffic volume and/or regularity/irregularity of network traffic.

In some embodiments, a distribution policy (also can be referred to as a network traffic distribution policy or as a utilization policy) or distribution function defined based on the relationship between the routing distribution profile and the ranges of number value values 260, 262, 264, and 266 can be used by the session exchange device to route session requests. A distribution policy based on random number values, such as that described in connection with FIGS. 2A and 2B, can be referred to as a random number (RN) distribution policy. More details related to distribution functions are discussed in connection with FIG. 4. In some embodiments, the number value ranges can be stored in and/or accessed from a database.

In this embodiment, the number value ranges 260, 262, 264, and 266 can be defined to produce mutually exclusive routing. In other words, the number value ranges 260, 262, 264, and 266 are defined so that they do not overlap. In some embodiments, more than one number value range can be associated with a single network resource. For example, in some embodiments, number value range 260 and number value range 264 can be associated with network resource$_1$.

In some embodiments, one or more number value ranges, such as those shown in FIG. 2B, for example, can be modified based on one or more changes to a distribution profile (also can be referred to as a modified distribution profile), such as that shown in FIG. 2A (e.g., addition of a network resource or change in target utilization values). In some embodiments, the modified distribution profile, which is used for future network traffic distribution, can be changed in response to, for example, a change in financial objectives and/or a change in administrative objectives associated with one or more network resources. The modified distribution profile can be defined at an entity separate from a session exchange device. In some embodiments, the modified distribution profile can be defined in an off-line process separate (e.g., separate in space and/or time) from functions performed by the session exchange device and/or without feedback (e.g., feedback based on historical utilization-related data) from the session exchange device. Accordingly, the modified distribution profile can be received at a session exchange device after the modified distribution profile has been defined elsewhere. The number value ranges associated with the modified distribution profile and used for network traffic distribution can then be defined at, for example, the session exchange device in a calibration process.

In some embodiments, one or more number value ranges can be modified dynamically in response to one or more changes to an associated distribution profile. For example, one or more number value ranges can be modified in response to a network resource being unavailable during a future period of time (e.g., temporarily unavailable due to a network outage). In some embodiments, a network resource may be temporarily unavailable due to scheduled maintenance of the network resource.

Figure 3:
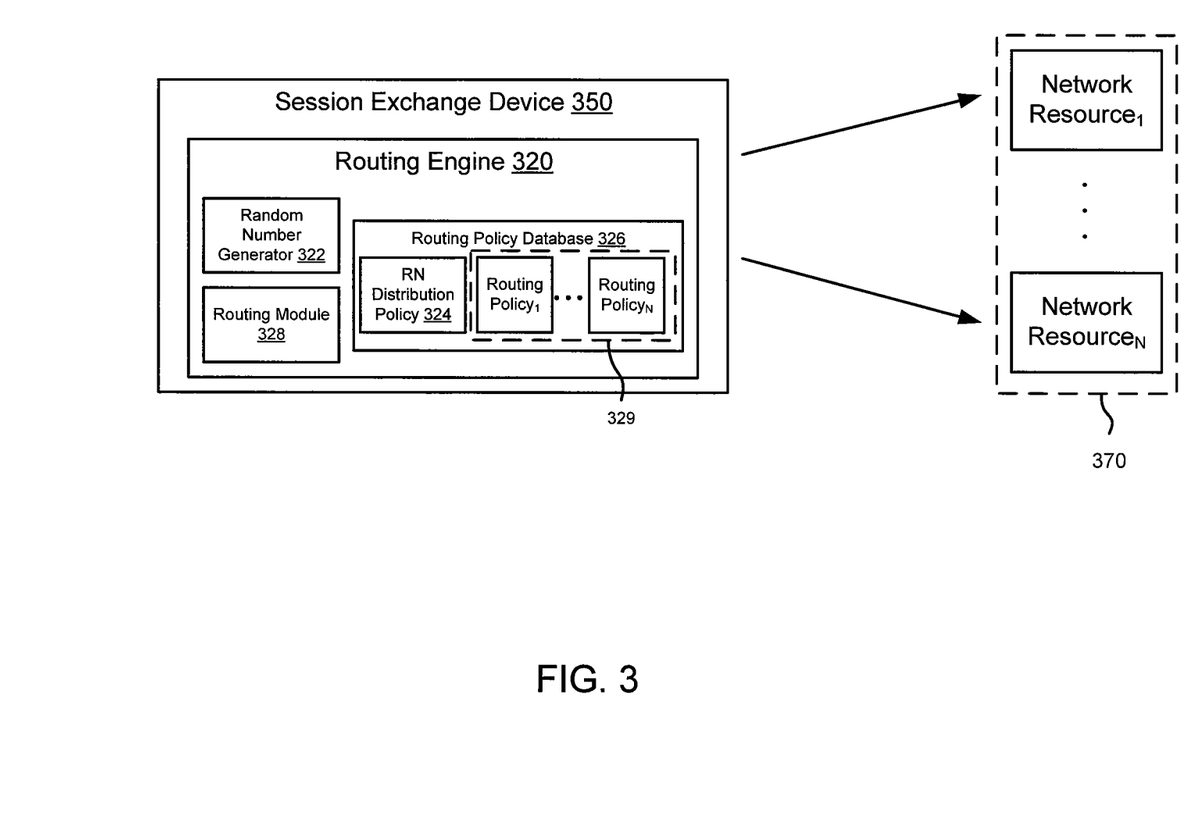
FIG. 3 is a schematic diagram that illustrates an example of a routing engine of a session exchange device configured to route a session request based on a random number value.

FIG. 3 is a schematic diagram that illustrates an example of a routing engine 320 of a session exchange device 350 configured to route a session request based on a random number value. As shown in FIG. 3, the routing engine 320 includes a random number generator 322, a routing module 328, and a routing policy database 326. The routing engine 320 is configured to route the session request to a network resource from a set of network resources 370 based on an RN distribution policy 324 included in the routing policy database 326. The set of network resources 370 include network resources 1 to N.

The random number generator 322 is configured to produce a random number value within a number value domain associated with the RN distribution policy 324. In some embodiments, the random number generator 322 can be a random number generator based on a physical phenomenon (e.g., white noise, radioactive decay, thermal noise) or a computationally-based random number (e.g., a pseudo-random number generator, a pseudo-random number generator with a relatively high correlation rate). For example, a computationally-based random number generator can be configured to produce a sequence of number values sufficiently random to achieve the desired target distribution profile (e.g., achieve the desired target distribution profile within specified time constraints and/or statistical limits) based on the network traffic volume received at the session exchange device 350. In some embodiments, the random number generator 322 can be a linear congruential generator, a lagged Fibonacci generator, a linear feedback shift register, and/or a generalized feedback shift register.

In some embodiments, a sequence of number values may be stored in a memory (not shown) and used (e.g., accessed) by the routing engine 320 to make a routing determination. A number value from the sequence of number values may be selected by the routing engine 320 when making the routing determination. In such an embodiment, random number generator 322 may be excluded from the routing engine 320. The number value can be selected in an ordered fashion (e.g., a serial fashion, a sequential fashion, a periodic fashion) and/or randomly. In some embodiments, at least a portion of the sequence of number values may be produced by a random number generator. In some embodiments, at least a portion of the sequence of number values may be defined to approximate a sequence of random number values produced by, for example, a random number generator such as random number generator 322 shown in FIG. 3. In some embodiments, the sequence of number values may be defined so that the routing engine 320 can distribute network traffic in accordance with (e.g., within specified statistical limits associated with) a target distribution profile. The sequence of number values (e.g., a number of number values from the sequence, a range of the sequence of number values, etc.) can be defined based on a statistical calculation.

The routing module 328 is configured to modify session requests so that they are routed based on routing determinations made by the routing engine 320. In some embodiments, the routing module 328 can be configured to modify a portion of a session request (e.g., a layer-3 portion, a header associated with a session request) so that the session request is sent to a network resource selected from the set of network resources 370 based on the RN distribution policy 324. In other words, the session request can be directed to one of the network resources 370 based on the modified portion of the session request.

As shown in FIG. 3, the routing policy database 326 includes additional routing policies 329—policies 1 to N—in addition to the RN distribution policy 324. The additional routing policies 329 can be, for example, routing policies based on parameter values. The parameter values can be different than utilization-related data and/or unrelated to the distribution profile. For example, the parameter values can be media-layer parameter values and/or session-layer parameter values (e.g., an address value, a collective quality-of-service (QoS) parameter value, a day/time value, a day-of-the-week value). In some embodiments, the session-layer parameter value can be extracted from and/or determined/calculated based on, for example, the session request, a different session-control-protocol message associated with the session, and/or one or more parameter values that are not session-layer parameter values (e.g., media-layer parameter values).

In some embodiments, the routing engine 320 can use the additional routing policies 329 to route session requests received at the session exchange device 350. In some embodiments, the routing module 328 can route a session request based on a combination of the RN distribution policy 324 and an additional routing policy 329. For example, the routing module 328 can determine that a session request should be routed to a first network resource based on the RN distribution policy 324, and can determine that the session request should be routed to a second network resource based on an additional policy (e.g., routing policy$_1$) from the additional routing policies 329. The routing module 328 can route the session request based on whether a routing determination based on the RN distribution policy 324 takes priority over a routing determination based on the additional policies 329.

In some embodiments, the RN distribution policy 324 can be based on parameter values such as session-layer parameter values. For example, an RN distribution policy can be (or can be based on) a distribution function that is not only a function of a random number value, but also a function of a session-layer parameter value. In some embodiments, a routing determination can be made based on a distribution function modified based on a condition associated with a session-layer parameter value. For example, the routing module 328 can determine using a distribution function, that a session request should be routed to a first network resource based on a random number value and a session-layer parameter value even though the session request would have been routed to a second network resource based on the random number value alone. More details related to routing based on a distribution function and parameter values are set forth in connection with FIG. 4.

Although not shown, in some embodiments, the routing engine 320 (e.g., the routing module 328 of the routing engine 320) can be configured to select one of several RN distribution policies from a library of RN distribution policies based on a specified parameter value. For example, the routing module 328 can be configured to make a routing determination based on an RN distribution policy selected from a library of RN distribution policies. The RN distribution policy can be selected in response to a session-layer parameter value satisfying a threshold condition. For example, an RN distribution policy can be selected from a library of RN distribution policies in response to an address value being equal to a specified address value within a condition. In some embodiments, a specified RN distribution policy can be selected in response to an indicator that a network resource from the set of network resources 370 is unavailable.

In some embodiments, one or more portions of an RN distribution policy can be defined based on a default value(s), for example, if a random number value is not generated and/or if a parameter value cannot be determined. In some embodiments, more than one random number value can be used to produce a different random number value used in an RN distribution policy.

Figure 4:
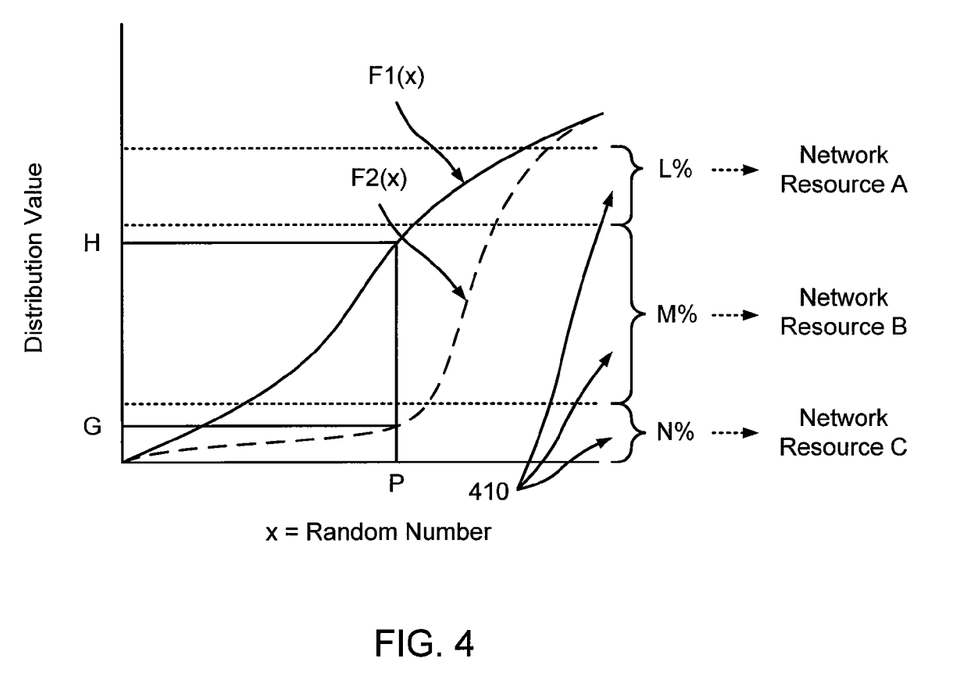
FIG. 4 is a graph that illustrates an example of a distribution function that can be used to route a session request to a network resource.

FIG. 4 is a graph that illustrates an example of a distribution function $F1(x)$ that can be used to route a session request to a network resource. The distribution function $F1(x)$ is a function of a random number value, and can be used to determine whether to route a session request to either network resource A, network resource B, or network resource C. As shown in FIG. 4, the distribution function $F1(x)$ is a non-linear function. A distribution value (shown on the y-axis) can be calculated based on a random number value (shown on the x-axis) using the distribution function $F1(x)$. A session request (or a portion of a session request) can be routed to one of the network resources A, B, or C based on whether the calculated distribution value falls within the limits 410 associated with each network resource A, B, or C. In other words, the session request can be routed to network resource B because the condition associated with network resource B has been satisfied.

For example, as shown in FIG. 4, a distribution value of H can be calculated using random number value P based on the distribution function $F1(x)$. The random number value can be produced and the distribution value can be calculated based on the random number value in response to a session request being received at a session exchange device. Also as shown in FIG. 4, the distribution value of H can trigger the session exchange device to route the session request to network resource B because H falls within the limits 410 associated with network resource B.

In some embodiments, the inflections in the distribution function $F1(x)$ can be defined based on coefficients and/or variables within the distribution function $F1(x)$. The coefficients and/or variables can be defined based on a range or domain of random number values produced by a random number generator and/or the limits 410 associated with the network resources. In some embodiments, a distribution function can be defined as a function of a random number value and one or more parameter values. In some embodiments, portions of the distribution function can be defined based on default values.

In some embodiments, the distribution function $F1(x)$ can be changed to distribution function $F2(x)$ (dashed line) based on a parameter value (e.g., a session-layer parameter value) associated with the session request. In some embodiments, the parameter value (e.g., a QoS value) can be used as, for example, a variable or as a coefficient that modifies the shape of the distribution function from $F1(x)$ to $F2(x)$.

In some embodiments, distribution function $F1(x)$ and distribution function $F2(x)$ can both be included in a library of distribution functions. Distribution function $F2(x)$, rather than distribution function $F1(x)$, can be selected by a routing engine based on a parameter value (e.g., a day/time value), and then used to make a routing determination. As shown in FIG. 4, distribution value G can be calculated using distribution function $F2(x)$ based on random number value P. Accordingly, a session request can be routed by a session exchange device to network resource C based on distribution value G.

For example, an entity that owns/controls network resources A, B, and C, may want network traffic distributed according to distribution function $F1(x)$ on certain days/times of the week and based on distribution function $F2(x)$ on other days/times of the week. The network traffic may be redistributed according to distribution function $F1(x)$ rather than distribution function $F2(x)$ to realize larger profit margins for the entity during specified days/times of the week by increasing the volume of traffic through a particular network resource. For example, a change from $F1(x)$ to $F2(x)$ may increase traffic distributed to network resource C, which may be a higher profit margin network resource.

Figure 5:
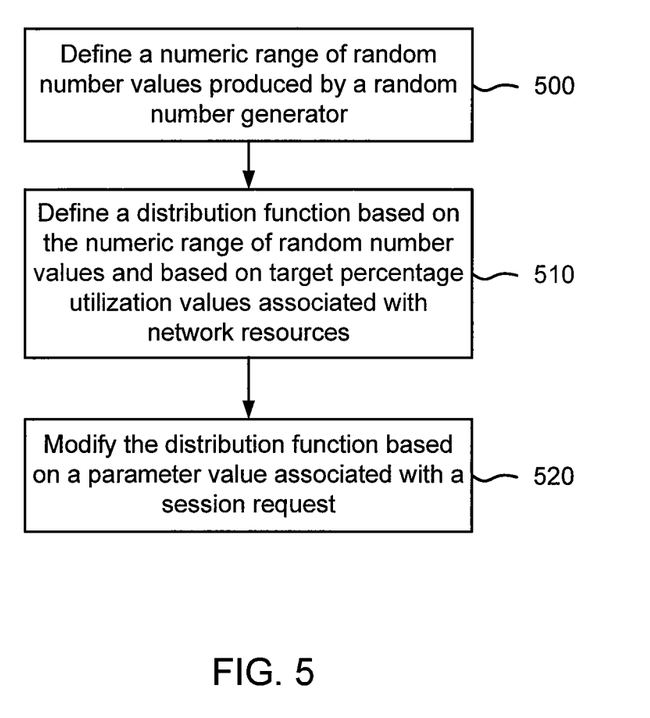
FIG. 5 is a flowchart that illustrates a method for defining and using a distribution function, according to an embodiment.

FIG. 5 is a flowchart that illustrates a method for defining and using a distribution function, according to an embodiment. In some embodiments, the defining of the distribution function (e.g., the portions of the method related to the defining of the distribution function) can be referred to as a calibration.

As shown in FIG. 5, a numeric range of random number values produced by a random number generator is defined at 500. The numeric range of random number values can be an entire domain of random number values or a subset of a domain of random number values such as a random number value range. The numeric range of random number values can correspond to those that can be produced by a random number generator.

A distribution function is defined based on the numeric range of random number values and based on target percentage utilization values associated with network resources at 510. The distribution function can be a non-linear distribution function such as that shown in FIG. 4, or a linear distribution function defined, for example, based on the relationship described in connection with FIGS. 2A and 2B. In some embodiments, the target percentage utilization values can define a non-uniform distribution profile. In some embodiments, the target percentage utilization values can be received from an entity separate from the session exchange device. Each target percentage utilization value can be associated with a network resource from a finite set of network resources.

Optionally, the distribution function can be modified based on a parameter value (e.g., a session layer parameter value and/or a layer-3 parameter value) associated with a session request at 520. For example, in some embodiments, the distribution function can be changed from a linear distribution function to a non-linear distribution function based on the parameter value.

Figure 6:
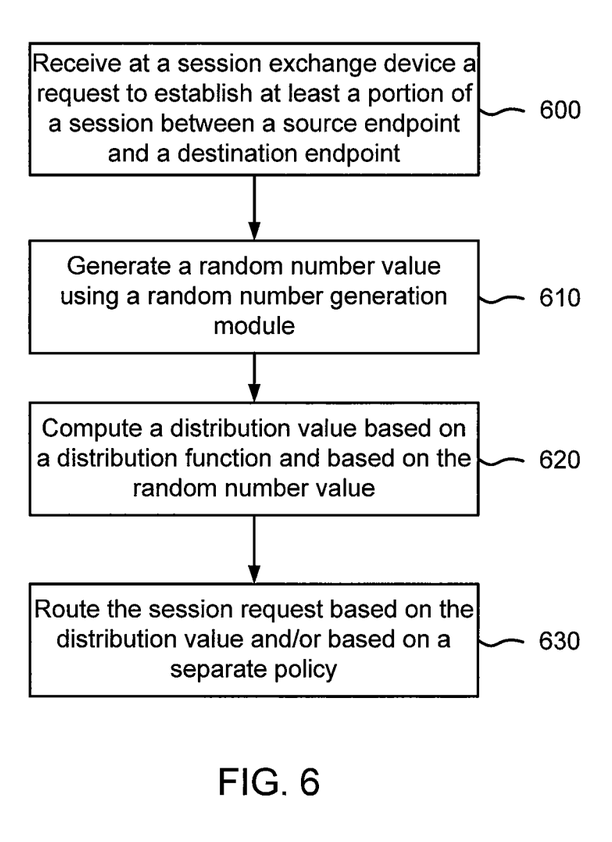
FIG. 6 is a flowchart that illustrates a method for routing a session request based on a distribution function and based on a random number value, according to an embodiment.

FIG. 6 is a flowchart that illustrates a method for routing a session request based on a distribution function and based on a random number value, according to an embodiment. As shown in FIG. 6, a request to establish at least a portion of a session (e.g., an egress portion of the session) between a source endpoint and a destination endpoint is received at a session exchange device at 600. The session request can be received from one or more source endpoints.

A random number value is generated using a random number generation module at 610. The random number value can be generated in response to the session request being received. A distribution value is calculated based on a distribution function and based on the random number value at 620. The distribution value can be calculated in response to the random number value being generated.

The session request is routed based on the distribution value and/or based on a separate policy at 630. In some embodiments, the session request can be routed based on a modification to, for example, a header portion associated with the session request.

Some embodiments relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signals; and hardware devices that are specially configured to store and execute program code, such as ASICs, Programmable Logic Devices (PLDs), and Read-Only Memory (ROM) and Random-Access Memory (RAM) devices. Examples of computer code include, but are not limited to, micro-code or micro-instructions, machine instructions, such as produced by a compiler, and files containing higher-level instructions that are executed by a computer using an interpreter. For example, an embodiments may be implemented using Java, C++, or other object-oriented programming language and development tools. Additional examples of computer code include, but are not limited to, control signals, encrypted code, and compressed code.

In conclusion, among other things, methods and apparatus for network traffic distribution based on random number values are described. While various embodiments have been described above, it should be understood that they have been presented by way of example only, and various changes in form and details may be made. Any portion of the apparatus and/or methods described herein may be combined in any combination, except mutually exclusive combinations. For example, multiple session exchange devices can each be configured to route session request to a single set of network resources based on random number values.

What is claimed is:

1. A method, comprising:
at a session border controller (SBC):
receiving a request to establish at least a portion of a session over Internet Protocol (SoIP) session between a source endpoint and a destination endpoint;
producing a random number value in response to the receiving;
defining a non-linear distribution function for determining a distribution value as a function of the random number value, wherein the non-linear distribution function defines a first curve specifying a first relationship between random numbers and traffic distribution values, wherein, in the first relationship, an independent variable represents the random numbers and a dependent variable represents the traffic distribution values;
calculating a traffic distribution value by inputting the random number value into the non-linear distribution function;
assigning first percentages of traffic distribution values to network resources based on utilization target values for the network resources, the first percentages of traffic distribution values corresponding to portions of the first curve;
routing the request to a network resource from a set of network resources when the traffic distribution value is within a number value range defined based on a utilization target value associated with the network resource, wherein:
the utilization target value is independent of historical utilization data associated with the network resource;
the historical utilization data includes at least one of real-time, recent, current and past utilization measurement values;
changing the distribution function to a second distribution function that defines a second curve having a different shape from the first curve and that alters the percentages of traffic distribution values assigned to the network resources, the second curve defining a second relationship between the random numbers and the traffic distribution values that is different from the first relationship and wherein, in the second relationship, the independent variable represents the random numbers and the dependent variable represents the traffic distribution values; and
routing at least one additional request to establish at least a portion of a SoIP session using the second distribution function.

2. The method of claim 1, wherein the number value range is defined based on a plurality of target utilization values associated with the set of network resources, the utilization target value is from the plurality of target utilization values.

3. The method of claim 1, wherein:
the network resource is a first network resource;
a second network resource from the set of network resources is associated with a number value range different than the number value range associated with the first network resource; and
the request is routed to the second network resource from the set of network resources when the random number value is within the number value range associated with the second network resource.

4. The method of claim 1, wherein the modifying includes modifying based on at least one of a session-layer parameter value associated with the request or a layer-3 parameter value associated with the request.

5. The method of claim 1, wherein the network resource is disposed between the session exchange device and the destination endpoint.

6. The method of claim 1, wherein the portion is a first portion defined based on a layer-3 protocol, the request includes a second portion defined based on a layer-5 protocol.

7. The method of claim 1, wherein the modifying includes modifying based on a distribution policy independent of a utilization target value associated with the network resource.

8. The method of claim 1, wherein routing the request includes modifying a portion of the request based on the random number value.

9. An apparatus, comprising:
a session border controller (SBC) including a random number generation module and a routing module;
the random number generation module being configured to produce a plurality of random number values; and
the routing module being configured to:
receive the plurality of random number values from the random number generation module;
define a non-linear distribution function for determining a traffic distribution value as a function of the random number value, wherein the non-linear distribution function defines a first curve specifying a first relationship between random numbers and traffic distribution values, wherein, in the first relationship, an independent variable represents the random numbers and a dependent variable represents the traffic distribution values;
calculate a traffic distribution value by inputting the random number value into the non-linear distribution function;
assign first percentages of distribution values to network resources based on utilization target values for the network resources, the first percentages of distribution values corresponding to portions of the first curve;
route a session request based on the plurality of random number values a plurality of session requests via a set of network resources within a SoIP network substantially in accordance with a non-uniform routing distribution profile associated with the set of network resources, wherein:
the non-uniform routing distribution profile includes one or more utilization target values associated with the network resources;
the utilization target values are independent of historical utilization data associated with the network resources;
the historical utilization data includes at least one of real-time, recent, current and past utilization measurement values; and
wherein the routing module is further configured to change the distribution function to a second distribution function that defines a second curve having a different shape from the first curve and that alters the percentage of traffic distribution values assigned to the network resources and to route at least one additional request to establish at least a portion of a SoIP session using the second distribution function, wherein the second curve defines a second relationship between the random numbers and the traffic distribution values that is different from the first relationship, and, in the second relationship, the independent variable represents the random numbers and the dependent variable represents the traffic distribution values.

10. The apparatus of claim 9, wherein:
the random number values are included within a number value range; and
each session request from the plurality of session requests is routed based on a distribution function defined by a relationship between the number value range and the non-uniform routing distribution profile.

11. The apparatus of claim 9, wherein each session request from the plurality of session requests is associated with at least one random number value from the plurality of random number values.

12. The apparatus of claim 9, wherein:
the random number values are included within a number value range;
a portion of the number value range is associated with a portion of the non-uniform routing distribution profile and is associated with a network resource from the set of network resources; and
a session request from the plurality of session requests is routed to the network resource when a random number value associated with the session request is within the portion of the number value range.

13. The apparatus of claim 9, further comprising:
a policy database operably coupled to the routing module, the routing module being configured to route the plurality of session requests based on a policy accessed from the policy database, the policy being independent of the non-uniform routing distribution profile.

14. A non-transitory processor-readable medium storing code representing instructions to cause a processor to perform a process, the code comprising code to:
at a session border controller (SBC):
receive, from a source endpoint, a request to establish a session via a SoIP network with a destination endpoint;
produce a random number value;
define a non-linear distribution function for determining a traffic distribution value as a function of the random number value, wherein the non-linear distribution function defines a first curve specifying a first relationship between random numbers and traffic distribution values wherein, in the first relationship, and independent variable represents the random numbers and a dependent variable represents the traffic distribution values;
calculate a traffic distribution value by inputting the random number value into the non-linear distribution function;
assign first percentages of distribution values to network resources based on utilization target values for the network resources, the first percentages of traffic distribution values corresponding to portions of the first curve;
route the request to a network resource from a set of network resources when the random number value satisfies a condition defined based on a set of utilization target values associated with the set of network resources, wherein:
each utilization target value is independent of historical utilization data associated with the network resource; and
the historical utilization data includes at least one of real-time, recent, current and past utilization measurement values; wherein the non-transitory processor readable medium further comprises code configured to:
change the distribution function to a second distribution function that defines a second curve having a different shape from the first curve and that alters the percentage of distribution values assigned to the network resources, wherein the second curve defines a second relationship between the random numbers and the traffic distribution values that is different from the first relationship, and, in the second relationship, the independent variable represents the random numbers and the dependent variable represents the traffic distribution values; and
route at least one additional request to establish at least a portion of a SoIP session using the second distribution function.

15. The non-transitory processor-readable medium of claim 14, wherein:
the random number value is produced in response to the request being received;
the condition is defined based on a range of number values; and
the condition is satisfied when the random number value is within the range of number values.

16. The non-transitory processor-readable medium of claim 14, wherein:
the condition is defined based on a range of number values; and
each network resource from the set of network resources is associated with at least one utilization target value from the set of utilization target values.

17. A method, comprising:
at a session border controller (SBC):
receiving a routing distribution profile associated with a set of network resources disposed between a source endpoint and a destination endpoint, the set of network resources being within a SoIP network; and
defining a non-linear distribution function for determining a traffic distribution value as a function of a random number value;
assigning first percentages of traffic distribution values to network resources based on utilization target values for the network resources, the first percentages of traffic distribution values corresponding to portions of the first curve;
generating a random number value;
calculating a distribution value by inputting the random number value into the non-linear distribution function, wherein the non-linear distribution function defines a first curve specifying a first relationship between random numbers and traffic distribution values, wherein, in the first relationship, an independent variable represents the random numbers and a dependent variable represents the traffic distribution values;
routing, via a network resource from the set of network resources, a request to establish a session between the source endpoint and the destination endpoint when the traffic distribution value is within a number value range defined based on a utilization target value associated with the network resource, wherein:
the routing distribution profile includes a utilization target value associated with the network resource;
the utilization target value is determined independent of historical utilization data associated with the network resource; and
historical utilization data includes real-time, recent, current or past utilization measurement values, or feedback;
changing the distribution function to a second distribution function that defines a second curve having a different shape from the first curve and that alters the percentage of distribution values assigned to the network resources, wherein the second curve defines a second relationship between the random numbers and the distribution values that is different from the first relationship, and, in the second relationship, the independent variable represents the random numbers and the dependent variable represents the traffic distribution values; and
routing at least one additional request to establish at least a portion of a SoIP session using the second distribution function.

18. The method of claim 17, wherein the distribution function has a coefficient defined based on the routing distribution profile and a coefficient defined based on a policy separate from the routing distribution profile.

19. The method of claim 17, further comprising:
receiving at least one of a session-layer parameter value associated with the request or a layer-3 parameter value associated with the request; and
modifying the distribution function based on the at least one of the session-layer parameter value associated with the request or the layer-3 parameter value associated with the request.

* * * * *